(12) United States Patent
Harwig et al.

(10) Patent No.: US 7,877,166 B2
(45) Date of Patent: Jan. 25, 2011

(54) RFID NAVIGATIONAL SYSTEM FOR ROBOTIC FLOOR TREATER

(75) Inventors: Jeffrey L. Harwig, New Berlin, WI (US); Thomas Jaworski, Racine, WI (US); Michael M. Sawalski, Racine, WI (US); Dik Man Yeung, Hong Kong (HK); Dragon Su, Shen Zhen (CN)

(73) Assignee: S.C. Johnson & Son, Inc., Racine, WI (US)

( * ) Notice: Subject to any disclaimer, the term of this patent is extended or adjusted under 35 U.S.C. 154(b) by 1173 days.

(21) Appl. No.: 11/168,631

(22) Filed: Jun. 28, 2005

(65) Prior Publication Data

US 2006/0293794 A1    Dec. 28, 2006

(51) Int. Cl.
G05B 19/18 (2006.01)
(52) U.S. Cl. ................................ 700/253; 700/245
(58) Field of Classification Search ............. 700/245, 700/253; 180/23; 318/568.11, 568.12
See application file for complete search history.

(56) References Cited

U.S. PATENT DOCUMENTS

| | | | |
|---|---|---|---|
| 5,165,064 A | 11/1992 | Mattaboni | |
| 5,613,261 A * | 3/1997 | Kawakami et al. | 15/98 |
| 5,682,313 A | 10/1997 | Edlund et al. | |
| 5,883,582 A | 3/1999 | Bowers et al. | |
| 6,049,745 A | 4/2000 | Douglas et al. | |
| 6,255,793 B1 * | 7/2001 | Peless et al. | 318/580 |
| 6,346,884 B1 | 2/2002 | Uozumi et al. | |
| 6,370,452 B1 | 4/2002 | Pfister | |
| 6,459,955 B1 | 10/2002 | Bartsch et al. | |
| 6,459,966 B2 | 10/2002 | Nakano et al. | |
| 6,463,360 B1 | 10/2002 | Terada et al. | |
| 6,574,549 B2 | 6/2003 | Cato et al. | |
| 6,594,844 B2 | 7/2003 | Jones | |
| 6,611,738 B2 | 8/2003 | Ruffner | |
| 6,622,088 B2 | 9/2003 | Hood | |
| 6,671,592 B1 * | 12/2003 | Bisset et al. | 701/23 |
| 6,690,134 B1 | 2/2004 | Jones et al. | |
| 6,705,522 B2 | 3/2004 | Gershman et al. | |
| 6,809,490 B2 | 10/2004 | Jones et al. | |
| 6,883,201 B2 | 4/2005 | Jones et al. | |
| 2001/0027360 A1 | 10/2001 | Nakano et al. | |
| 2002/0016649 A1 | 2/2002 | Jones | |

(Continued)

FOREIGN PATENT DOCUMENTS

DE    10346216    *    9/2004

(Continued)

OTHER PUBLICATIONS

DE 10346216 Translation.*

(Continued)

*Primary Examiner*—Thomas G Black
*Assistant Examiner*—Ce Li

(57) ABSTRACT

Disclosed herein are navigational systems for automated robotic floor cleaners. RFID passive tags are positioned at specified areas of a floor to be treated so as to increase or decrease dwell time of the cleaning device adjacent the tags. An RFID interrogator on the robot learns from each tag its nature, and based thereon instructs the device to change the dwell time over specified areas. This permits areas of a carpet or other surface requiring extra or less treatment to be cleaned in an optimal manner.

23 Claims, 11 Drawing Sheets

U.S. PATENT DOCUMENTS

| | | |
|---|---|---|
| 2002/0156556 A1 | 10/2002 | Ruffner |
| 2002/0183979 A1 | 12/2002 | Wildman |
| 2003/0009270 A1 | 1/2003 | Breed |
| 2003/0014186 A1 | 1/2003 | Adams, Jr. et al. |
| 2003/0080901 A1 | 5/2003 | Piotrowski |
| 2003/0234730 A1 | 12/2003 | Arms et al. |
| 2004/0002305 A1 | 1/2004 | Byman-Kivivuori et al. |
| 2004/0034466 A1 | 2/2004 | Hood |
| 2005/0188494 A1* | 9/2005 | Takenaka .................... 15/319 |

FOREIGN PATENT DOCUMENTS

| | | |
|---|---|---|
| WO | WO 02/00819 A1 | 1/2002 |
| WO | WO 02/101477 A2 | 12/2002 |

OTHER PUBLICATIONS

Svetlana Domnitcheva: "Smart Vacuum Cleaner—An Autonomous Location-Aware Cleaning Device" International Conference on Ubiquitous Computing (Online) Sep. 10, 2004 Nottingham, England Retrieved from the Internet: URL :http://ublcomp.org/ubicomp2004/adjunct/posters/domnitch.pdf>.

Jurgen Bohn and Friedemann Mattern: "Super-distributed RFID Tag Infrastructures" Second European Symposium, EUSAI 2004 (Online) Nov. 11, 2004 Eindhoven, The Netherlands Retrieved from the Internet: URL :http://www.springerlink.com/content/lrqp441x6mcf3ktm/fulltext.pdf>.

* cited by examiner

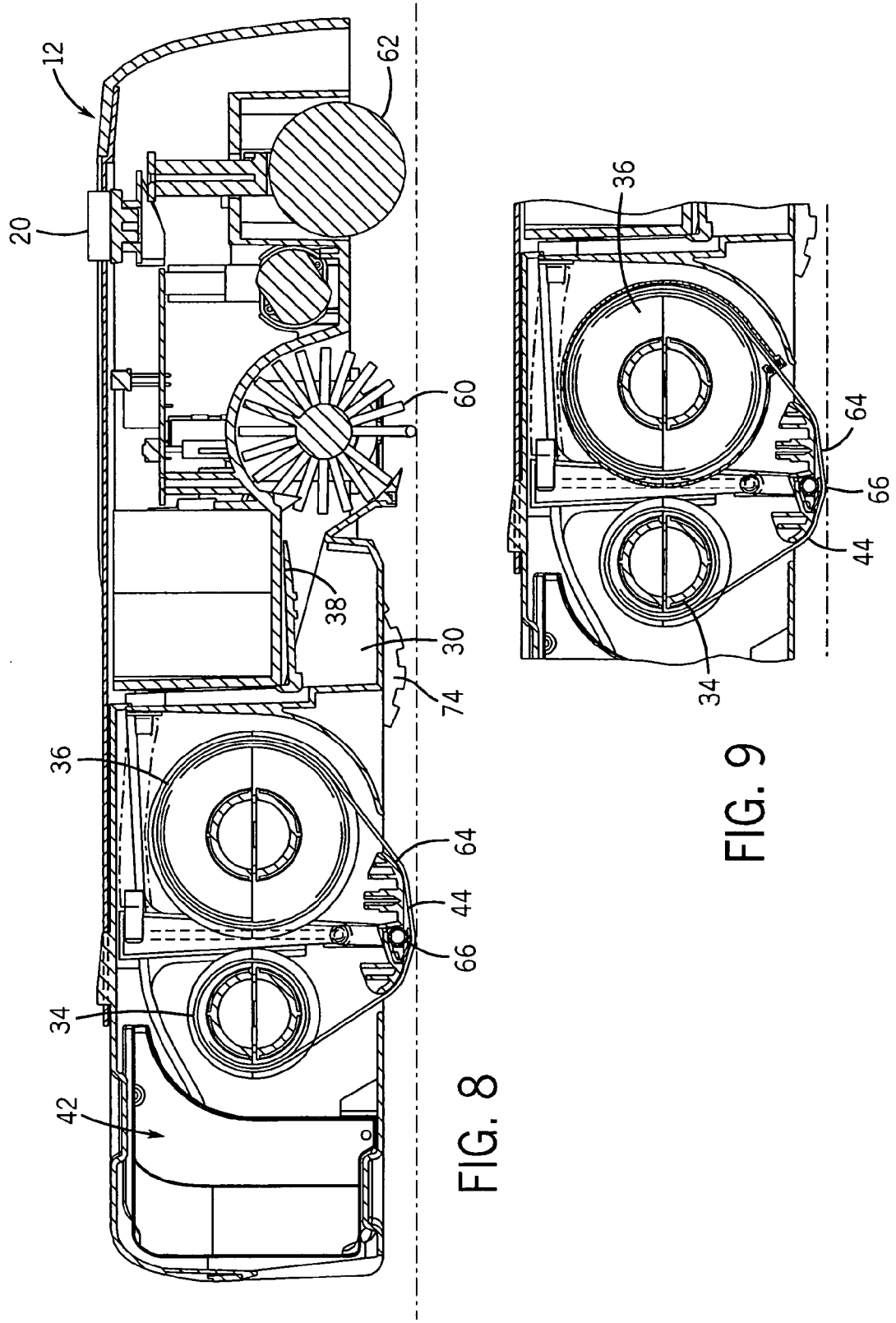

RFID NAVIGATIONAL SYSTEM FOR ROBOTIC FLOOR TREATER

CROSS-REFERENCE TO RELATED APPLICATIONS

Not applicable

STATEMENT REGARDING FEDERALLY SPONSORED RESEARCH/DEVELOPMENT

Not applicable

BACKGROUND OF THE INVENTION

It is desirable to minimize the amount of human labor expended in maintaining and cleaning buildings. The art has therefore developed autonomous robotic devices that can clean or otherwise maintain or treat hard floors, carpeting and similar surfaces without the necessity for a human to be present during the operation of the device.

Such robotic devices typically have a programmable controller for directing the device in a preferred movement pattern. The controller is linked to motors that drive the wheels of the device. Many of these devices also include sensors to detect positions of the device relative to a pre-set path or relative to an obstacle such as a wall or a staircase. Other of these devices include programming to provide for a pre-set navigational path, and sensors to detect the presence of unexpected obstacles in the pre-set path such that the pre-set path may be altered to avoid the obstacles.

For example, U.S. Pat. No. 5,682,313 discloses a floor cleaning robot where ultrasonic transponders are placed in a room to help the cleaning robot move about the room. Another example is U.S. Pat. No. 5,165,064 which discloses a mobile robot where infrared beacons are placed in a room to help the robot move about an area.

U.S. Pat. No. 6,049,745 discloses automatic guided vehicles (factory material movers) wherein radio frequency identification ("RFID") tags are provided along the path over which the vehicle travels. Each RFID tag is capable of conveying at least one unique radio frequency signal to a remote reader in response to electromagnetic excitation fields emitted by a remote interrogator. The vehicle has a computer and the remote RFID interrogator and reader. The computer is responsive to characteristic area conditions identified by the RFID reader for navigating the vehicle through the area. The RFID tags can thereby provide directions to a destination for the vehicle.

Similarly, U.S. Pat. No. 6,459,966 describes a passenger train that is navigated along a route using RFIDs. A route is provided for a vehicle, which corresponds to RFIDs having a memory storing in advance the RFIDs own location information on the route. An RFID interrogator is mounted on the train which transmits radio waves to the RFIDs. In response, the RFIDs provide information to the train's reader regarding location. A controller on the vehicle then controls a moving direction of the vehicle based on the position information to guide the vehicle along the route.

For various other navigational and obstacle avoidance systems applied to robotic devices see generally U.S. Pat. Nos. 6,370,452, 6,594,844, 6,671,592 and 6,690,134.

While various electromagnetic systems have therefore been used for navigational control and obstacle avoidance in autonomous robots, the above listed systems have not been designed to automatically alter the dwell time of the robot in response to temporary conditions (e.g. a heavily soiled area requiring extra cleaning time; a particular area that is so clean as not to require substantial additional cleaning during this cleaning opportunity). As a result, cleaning performance of such robots has not yet been optimized.

Therefore, a need exists for improved robotic floor treaters where the dwell time of the device can be easily and reliably altered to account for temporary conditions.

BRIEF SUMMARY OF THE INVENTION

The invention provides one or more RFID tags that can be positioned along or adjacent to a floor surface to interact with a controller on a robotic floor treater (e.g. cleaner) so as to change a default dwell time of the treater over an area adjacent the tag. In one form, the tag can be positioned on the floor (e.g. on a carpet) and can transmit a signal causing the treater to treat for a greater amount of time adjacent the tag. In another form, the tag can be positioned on the floor and can transmit a signal causing the treater to spend less time (or even no time) adjacent the area of the floor adjacent that tag.

The robot will have an RFID interrogator that transmits signals to such an RFID tag, and an RFID reader that receives signals induced from the RFID tag by the interrogator. The robot will also preferably have a controller that interprets the type of signal that the reader has received, and based thereon provides navigational instructions to the device so as to cause the device to alter the amount of dwell time adjacent the tag.

Thus, a consumer can mark a portion of a carpet or the like where there is a spot or extra soil by placing the RFID tag near it. This will cause the device to clean for a longer period near the tag. RFID tags could be permanently placed near entryways or high traffic areas that are typically more heavily soiled.

Alternatively, a consumer can place a different type of RFID tag adjacent a portion of the floor which is either too clean to need further treatment, or coated with fresh polish or other chemicals. This will cause the controller to be informed that the dwell time near that should be reduced or eliminated, depending on the tag. Tags could also be used to avoid problem areas—areas where either the appliance could become stuck or damaged. (Typically small area rugs pose difficulties for robotic cleaners as loose edges of the rugs can easily be caught in the rotating brush). Tags could also be used in place of other cliff detection methods to avoid stairs or potentially damaging level changes.

The tag can be designed to control a specified radius around the tag (e.g. one meter), or can be designed to control a specified area adjacent and at one side of the tag. In any event, the tags may be employed for temporary or permanent use. When used on a temporary basis, the tag would typically be removed from the floor after a single cleaning event. When used on a permanent basis the tag may be left in place, mounted on a surface, or built into the area where it will be employed. For example, the tags would be mounted to surfaces for multiple uses. For instance, the tag could be attached or mounted permanently or removably to the underside of an area rug or piece of furniture in order to hide the tag. Tags could also be color matched with the environment to allow them to be placed in the open—and still blend with surroundings. Tags could also provide an improved method of room confinement vs. other known methods. The tags are small and less conspicuous than magnetic strips or bulky IR beam emitting devices presently used by some devices.

In preferred forms the invention provides a mobile autonomous robotic floor cleaning device that transmits a low-power radio frequency ("RF") signal aimed primarily in front of the device and that has the ability to receive digital RF signals back from passive RFID tags. Intelligent, passive (no-power) RFID tags intercept the mobile robot's RF signal and use the RF signal to power the RFID tag and then transmit an intelligent-digital RF signal back to the mobile robot, informing the robot of the presence of the RFID tag and what kind of RFID tag. The robot has a controller with a processor having a software algorithm to interpret the digital data and act on it accordingly, e.g., stay longer, spend less time.

The mobile robot may or may not change its course based on receiving the signal from the RFID tag. In this regard, it may simply slow or quicken the speed of travel. Alternatively, the robot may enter a spiral path around the tag where additional dwell time is desired.

The RFID tag is preferably of the passive type, meaning that it does not transmit a signal on its own absent external stimulation. The RFID tag may thus only transmit a signal to the mobile robot when the robot is sufficiently near the tag and the robot's RF energy has intercepted the tag.

In one form, the method of powering the RFID tags is by induction coupling, although other techniques such as propagating electromagnetic waves can be used. The RF signal from the RFID tag is a carrier signal that is transmitting an intelligent digital signal (32 bits, typical). The use of intelligent digital signal transmission allows for specific awareness by the mobile robot of detection and discrimination between tags and the objects in a room that the tags may be placed near.

For example, an RFID tag may be placed on a small oriental rug that is not to be treated with the same chemicals as the floor surrounding it. In such a case, an RFID tag labeled "stay away" would be positioned on the center of the rug during the cleaning operation. Alternatively, where dirt had been tracked on a defined area of a carpet a "clean more" tag could be positioned next to the dirt. Or again, the tags could be mounted in high traffic areas that are more likely to be more highly soiled.

Thus, the invention provides a system for navigating an automatic cleaning device within a location such as a room. The system includes one or more radio frequency identification tags positioned within or adjacent a selected surface area of the location. The system further includes an automatic cleaning device for treating the surface area.

Typically, the automatic cleaning device includes motors for driving a left wheel and a right wheel, and the motors are each controlled by the controller which includes a microprocessor under the control of a software program stored in the controller memory. The controller is in communication with a radio frequency identification unit which receives signals from the radio frequency identification tag indicating presence of the selected surface area. The radio frequency identification unit is typically located on the automatic cleaning device, albeit it could be for applying other chemicals (e.g. polishing), or providing other functions (e.g. buffing).

The stored program of the controller that drives the automatic cleaning device may use different routines. For instance, a radio frequency identification tag may be positioned in the center of the selected surface area, and the stored program drives the automatic cleaning device within a predetermined distance of the radio frequency identification tag for the extended time period. Alternatively, a plurality of radio frequency identification tags may positioned on a perimeter of the selected surface area, and the stored program drives the automatic cleaning device within the perimeter of the selected surface area for the extended time period. The invention provides a system for navigating an automatic cleaning device within a location. The system comprises a radio frequency identification tag positioned within or adjacent a selected surface area comprising a percentage of total surface area within the location; and an automatic cleaning device including a controller for driving the automatic cleaning device within the location for a predetermined time period, the controller being in communication with a radio frequency identification unit which receives signals from the radio frequency identification tag indicating presence of the selected surface area, wherein the controller executes a stored program to drive the automatic cleaning device within the selected surface area for a modified time period greater than or less than a reference time period calculated by multiplying the predetermined time period by the percentage.

Hence, the present invention provides inexpensive and reliable means of temporarily marking areas of a floor being treated for greater or lesser dwell time, thereby causing automatic instructions to be implemented by an automated robot to reduce or increase treatments adjacent those tags.

The foregoing and other advantages of the invention will become apparent from the following description. In the following description reference is made to the accompanying drawing which forms a part thereof, and in which there is shown by way of illustration preferred embodiments of the invention. These embodiments do not represent the full scope of the invention. Reference should therefore be made to the claims herein for interpreting the scope of the invention.

BRIEF DESCRIPTION OF THE DRAWINGS

FIG. 8 is a sectional view taken along line 8-8 of FIG. 7;

FIG. 9 is an enlarged view of the reel-to-reel portion of the present device, highlighting a portion of the FIG. 8 drawing;

DETAILED DESCRIPTION OF THE PREFERRED EMBODIMENTS

We first describe example autonomous cleaning devices with reference to FIGS. 1-11. This provides examples of environments where the invention of the present invention can be applied. Thereafter, we describe with reference to FIGS. 12-14 specific features of the present invention.

It should be understood that the present invention is also suitable for use with many other types of autonomous treating devices. Thus, the invention is not intended to be restricted to just cleaning devices, much less devices having the specific attributes shown in FIGS. 1-11.

Figure 1:
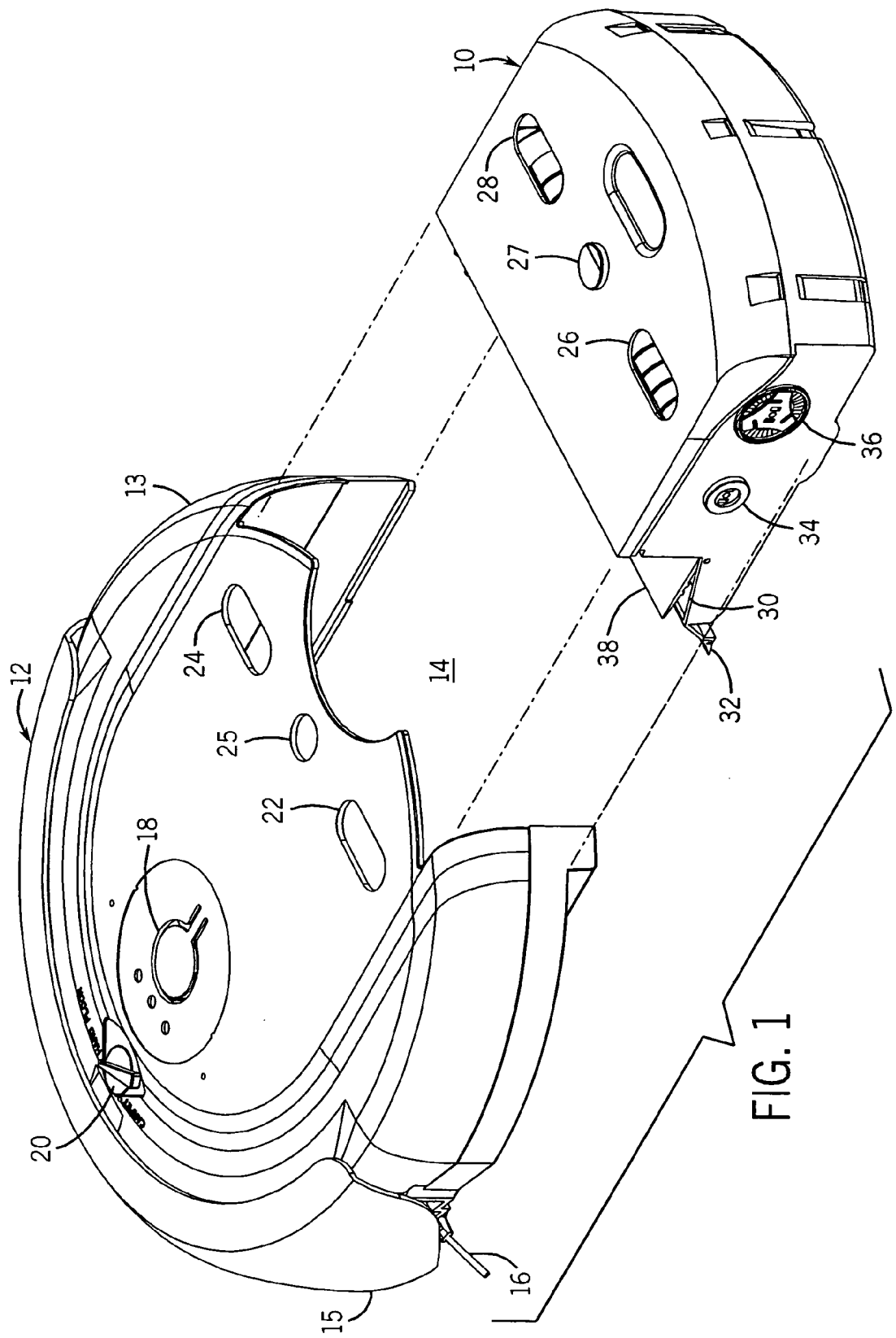
FIG. 1 is an exploded rear perspective view of an autonomous robotic surface treating device of the present invention.
Figure 3:
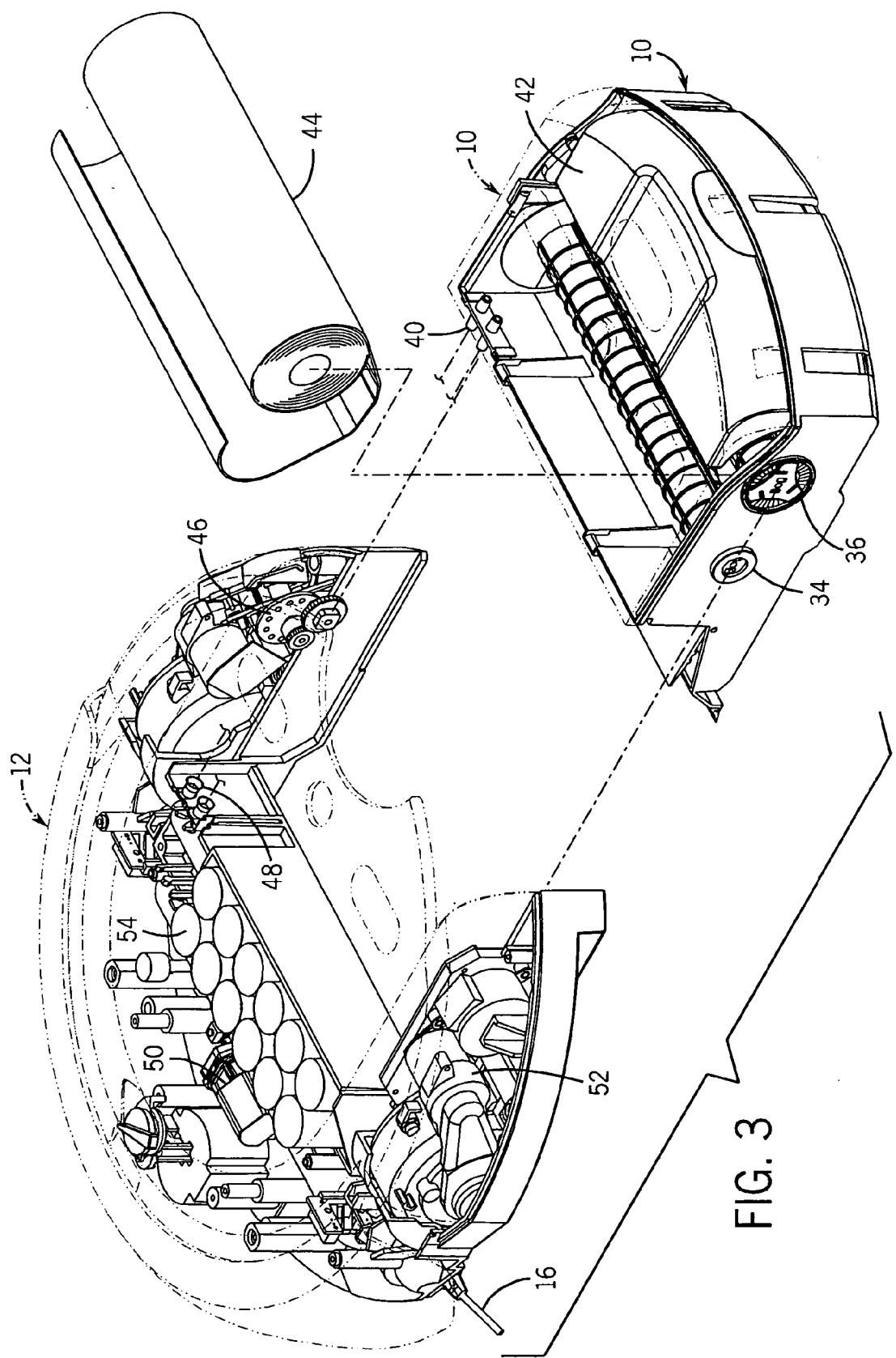
FIG. 3 is a view similar to FIG. 1, but with upper housings removed.

Referring particularly to FIGS. 1 and 3, there is a cleaning cartridge 10 suitable to be inserted into a cleaning device 12. The cleaning cartridge 10 has a roll of sheet form cleaning cloth 44 which is provided in a reel-to-reel configuration. A portion of the roll is maintained in contact with the surface below the cleaning device 12 at any given time during operation. A motor 52 is provided in the cleaning device 12 to consistently index the cleaning sheet material, so as to maintain a relatively fresh sheet against the floor.

Figure 2:
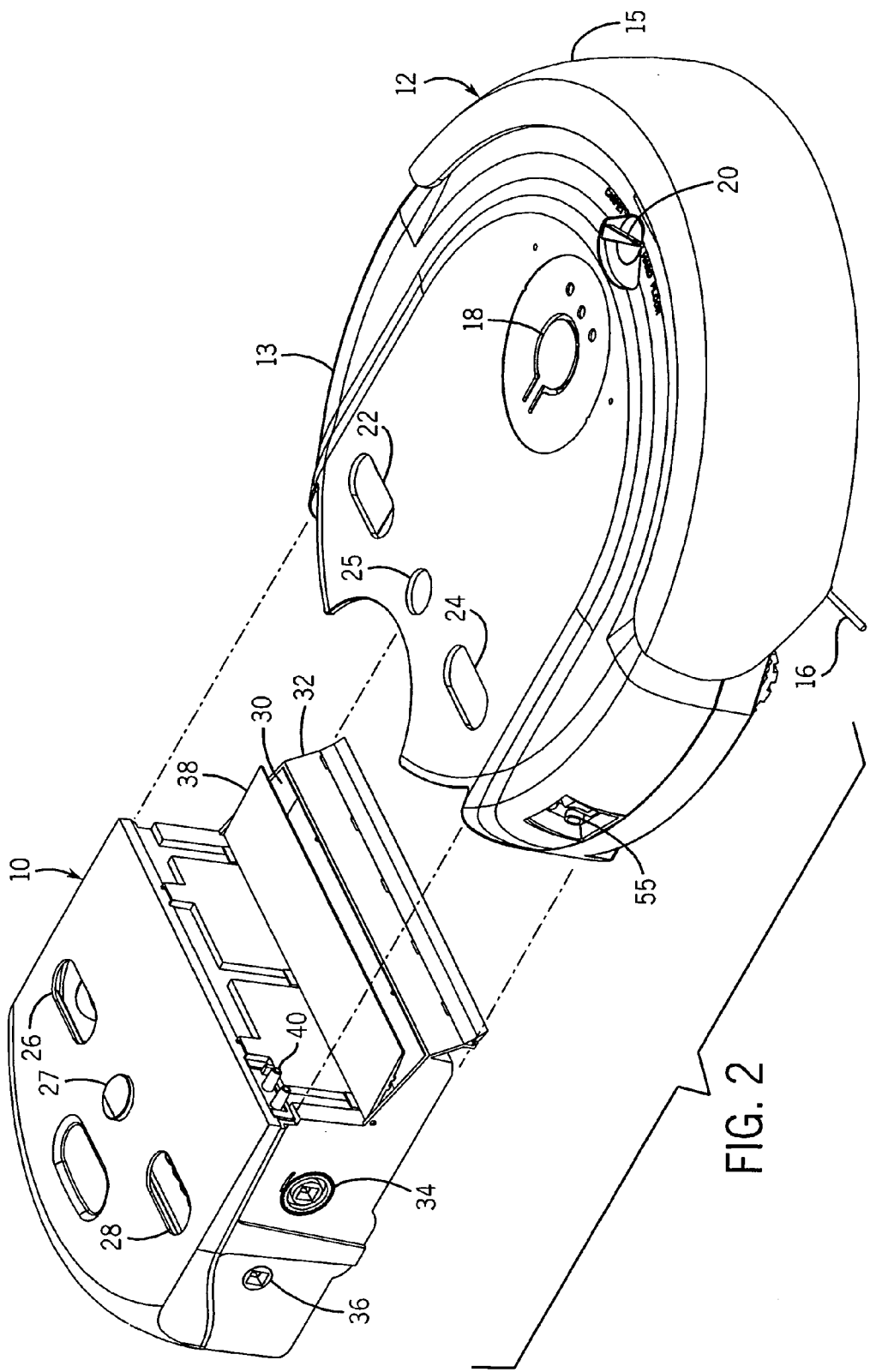
FIG. 2 is an exploded frontal perspective view of the device of FIG. 1.
Figure 4:
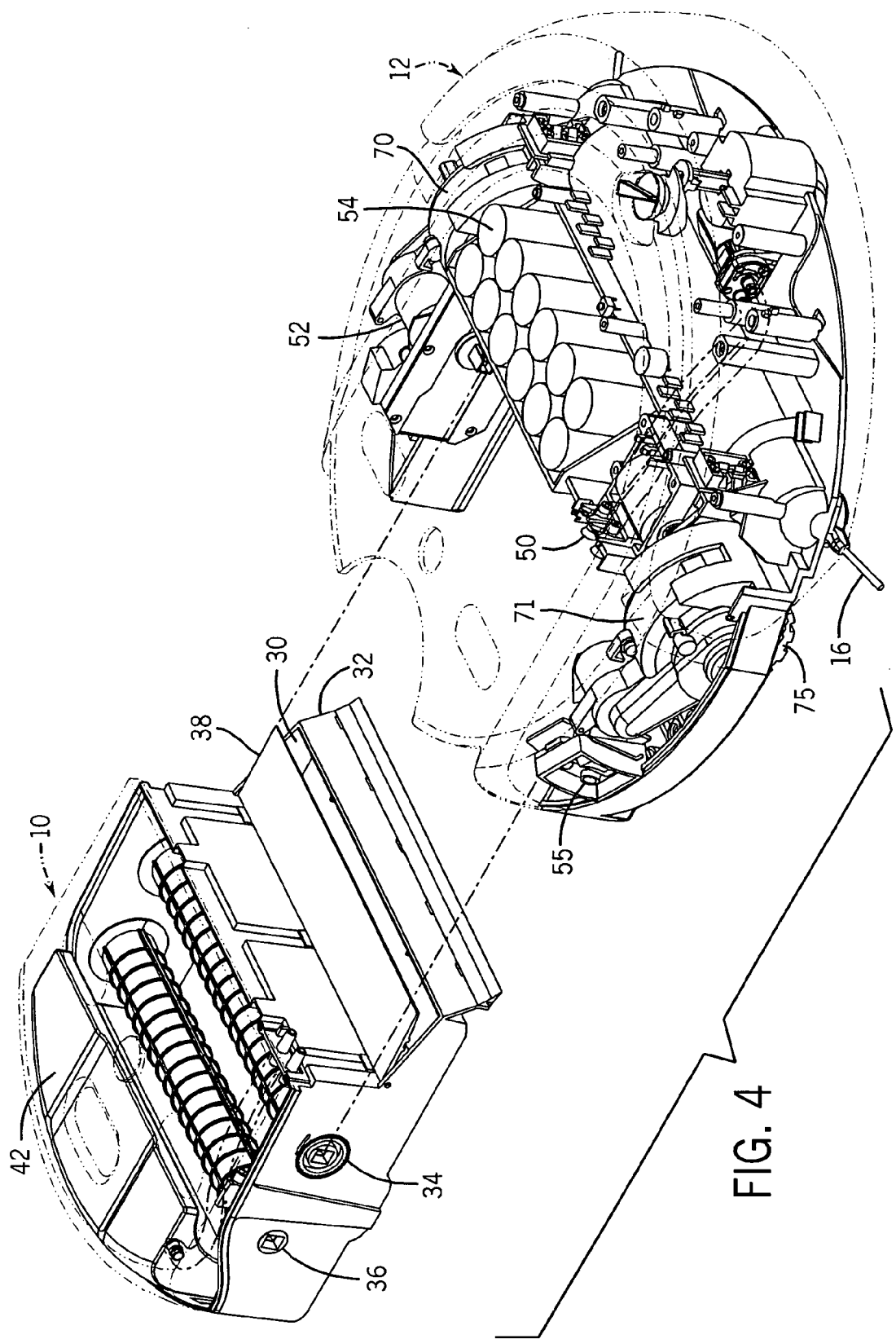
FIG. 4 is a view similar to FIG. 2, but with upper housings removed.
Figure 5:
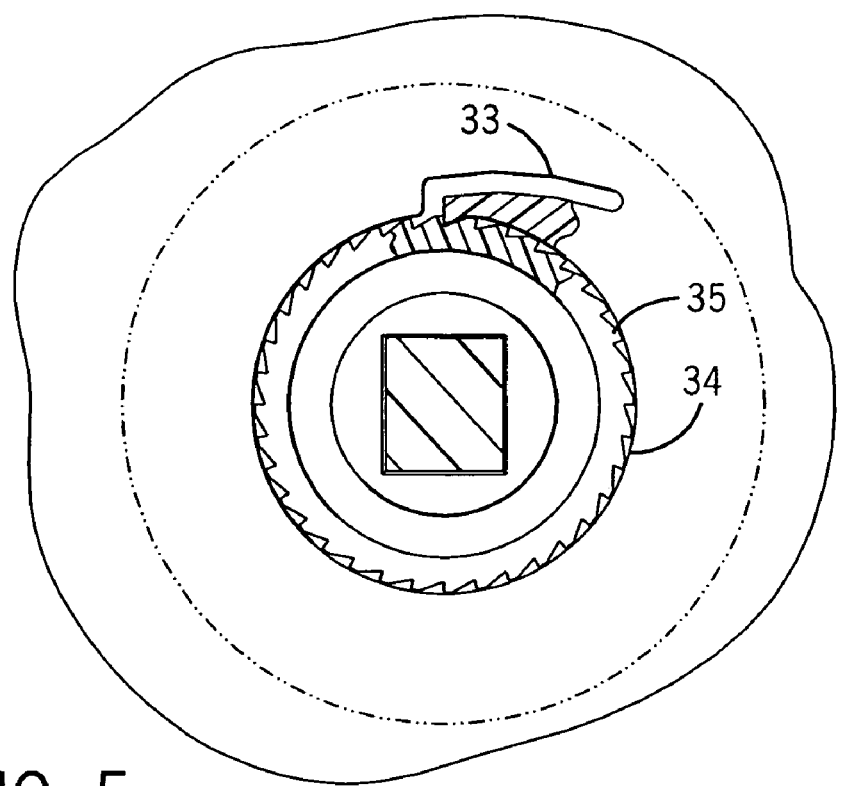
FIG. 5 is a schematic view illustrating how a take-up reel of the assembly is ratcheted for one-way motion.
Figure 6:
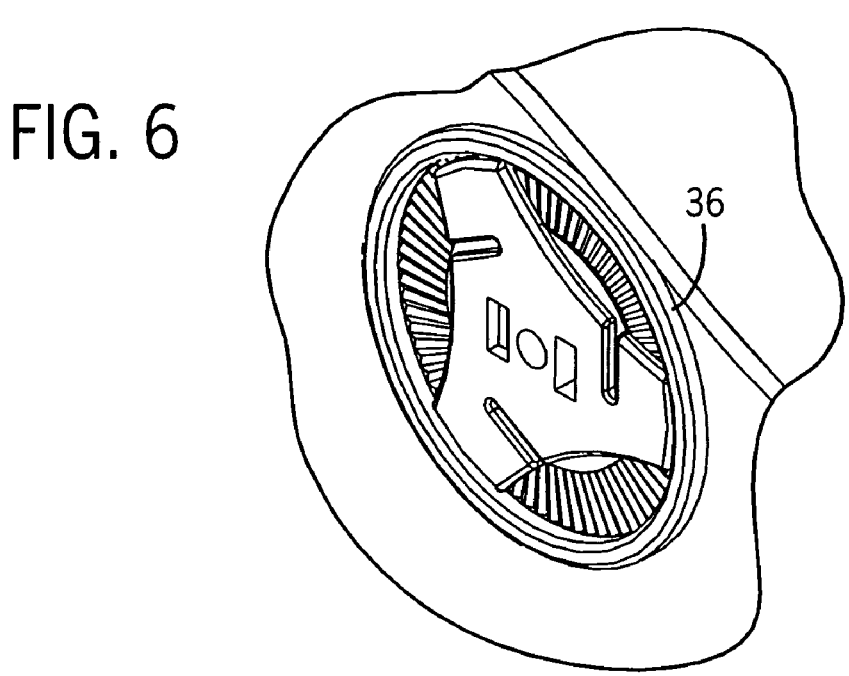
FIG. 6 is an enlarged perspective view of an end of a supply reel of the present assembly.
Figure 7:
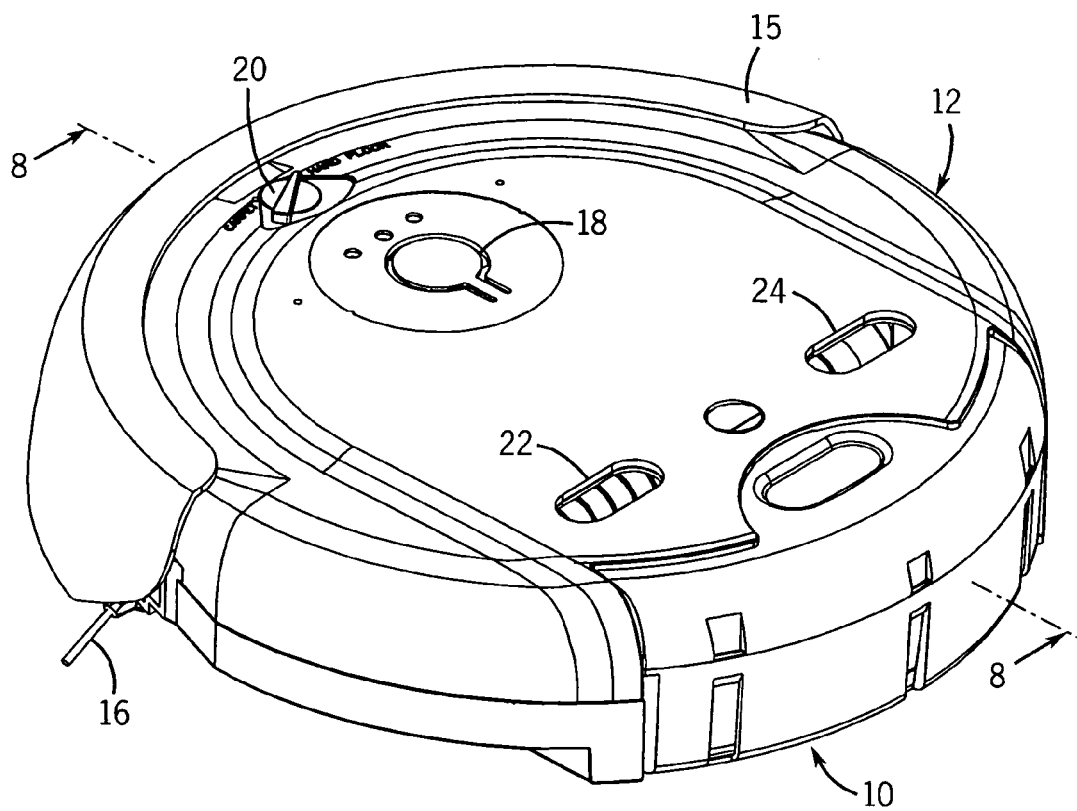
FIG. 7 is a view similar to FIG. 1, but showing the device in fully assembled form.

Referring now also to FIGS. FIGS. 2 and 4, the cleaning device 12 is in the form of an autonomous robot which includes a housing 13 having an aperture 14 sized and dimensioned to receive the cleaning cartridge 10. In the housing 13 and located above the aperture 14 are two windows 22 and 24 which allow the user to view the cleaning cartridge 10, and the roll of cleaning cloth 44 maintained therein.

An aperture 25 is also provided which, in conjunction with a latching device 27 on the cartridge 10, provides a latch for selectively connecting the cartridge 10 to the cleaning device 12. The cleaning device 12 also includes a bumper 15 at a front end and side brushes 16. As shown in FIG. 8, the cleaning device 12 also includes a sweeper brush 60 for cleaning large particulate matter. The cleaning cloth 44 follows the brush 60 and typically cleans smaller particulate matter such as hair and dust which have not been picked up through the use of the brush 60.

The cartridge 10 includes windows 26 and 28 which, when positioned in the cleaning device 12, are aligned with the windows 22 and 24 in the housing 13 of the cleaning device 12, thereby allowing a user visual access to the cleaning cloth 44 within the cartridge 10. A dust bin 30 is provided in the cleaning cartridge 10 at the end of the cartridge which is received inside of the housing 13 of the cleaning device 12.

The dust bin 30 is designed to be positioned adjacent the brush 60 (FIG. 8) in the cleaning device 12. It is selectively covered by a hinged lid 38, which is forced open as the cleaning cartridge 10 is moved into the cleaning device 12 but which swings shut and is therefore normally closed when the cartridge is removed from the cleaning device 12, thereby retaining dust collected by the cleaning device 12 within the dust bin 30 for cleaning, replacement, or disposal of the cartridge 10.

A flexible blade 32 is provided in front of the dust bin 30, directed from an upper edge of the dust bin 30 to the surface below the cartridge 10. The flexible blade 32 directs dirt collected by the brush 60 of the cleaning device 12 into the dust bin 30.

The reel-to-reel device provided in the cartridge 10 includes both a take-up reel 34, to which used cleaning cloth 44 is directed, and a supply reel 36, to which an unused roll of cleaning sheet material is connected and from which the cleaning process is supplied. The take-up reel 34 (FIG. 5) is ratcheted in order to prevent used cleaning cloth 44 from being directed back over the surface to be cleaned, while the supply reel 36 (FIG. 6) provides a resistive force limiting rolling of the sheet unless driven by the stepper motor 52. Teeth 35 in the take-up reel 34 are engaged with spring-loaded teeth 33 to ratchet the reel and limit motion.

The cleaning cloth 44 can comprise, for example, an electrostatic or electret material. Examples of such materials are those described in WO 02/00819. The cleaning cloth 44 can also provide a liquid treating or dispensation function. For example, the cleaning cloth can be treated with cleaning fluid or polishes to treat the floor with surfactants, insecticides, insect repellants, and/or fragrances.

The cartridge 10 can further comprise a fluid reservoir 42 for providing a fluid to the cleaning cloth 44 during operation. The fluid supply provided in the reservoir 42 is connected to a pump 50 provided in the cleaning device 12 through fluid inlets 40 provided on the cartridge 10 and fluid outlets 48 provided on the cleaning device 12. In operation, therefore, the control of fluid flow to the cleaning cloth 44 is controlled by the cleaning device 12, and is provided to the sheet material to maintain a selected level of moisture over the life of the cartridge.

A bank of batteries 54 provides power to the cleaning device, which is selectively activated by a switch 18 (FIG. 1) provided on the cleaning device 12. The batteries are preferably rechargeable, and are accessed through a port 55 provided in the side of the housing of the cleaning device 12 (FIG. 2)

The cloth supply reel 36 is driven by the stepper motor 52 provided in the cleaning device and the amount of the roll of the cleaning cloth 44 which is unwound during operation is monitored by an optical sensor 46, which is also provided in the cleaning device 12. The stepper motor 52, optical sensor 46, and pump 50 are each driven by a programmable controller (not shown, but positioned above the battery pack) based on timing which drives the stepper motor to replace the sheet material as necessary to maintain proper cleaning processes during a cleaning operation while monitoring actual movement of the sheet.

Similarly, the controller drives the pump 50 to supply fluid to the roll of cleaning cloth 44 as necessary during cleaning. The timing for replenishment of the fluid source is based on the type of material and fluid being employed, and in the expected life of the roll of cleaning cloth 44. The controller preferably maintains the cleaning cloth 44 in a constant tension, and, while in use, indexes at a predetermined rate, as for example, 0.75 inches per 5 minutes or thereabout, over the life of the cartridge. The stepper motor 52 is coupled to the take-up reel 34 through a series of gears, while the supply reel is coupled to the optical sensor which detects the amount of rotation of the supply wheel.

Referring now to FIGS. 8 and 9, the cleaning device 12 includes a beater or sweeping brush 60. A wheel 62 at the front of the cleaning device 12 is adjustable by activation of a switch 20 between at least two positions, one selected for use with a carpet, and another for use with a hard floor surface. As the cartridge 10 is inserted into the cleaning device 12 the flexible blade 32 is positioned adjacent the main brush 60 and receives the relatively large particulate matter collected by the brush as the cleaning device 12 is run across a floor surface. The particulates are directed up the flexible blade 32 by the main brush 60 and into the dust bin 30.

In operation the hinged lid 38 is retained in an open position such that the dust and particulate matter can be readily directed into the dust bin 30. Following behind the main brush 60 is the cartridge 10 including the cleaning cloth 44. The cleaning cloth 44 is retained against the surface to be cleaned by a platen 66 which includes a leaf-spring 64 that insures contact between the surface to be cleaned and the cleaning cloth 44. Also as described above, the reservoir 42 is provided adjacent the cleaning cloth 44 such that fluids can be applied to replenish the cloth when a wet or moist mop cloth is employed in the cleaning device 12.

Figure 10:
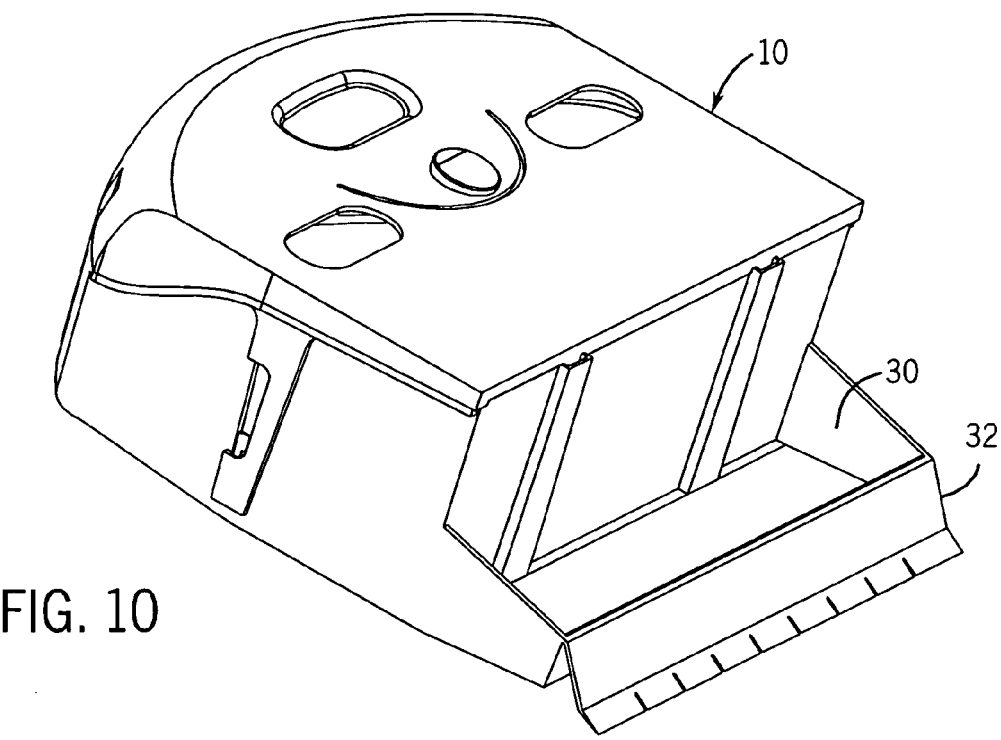
FIG. 10 is a front, left, upper perspective view of an alternative cartridge useful with the FIG. 1 device, when cleaning carpeting.
Figure 11:
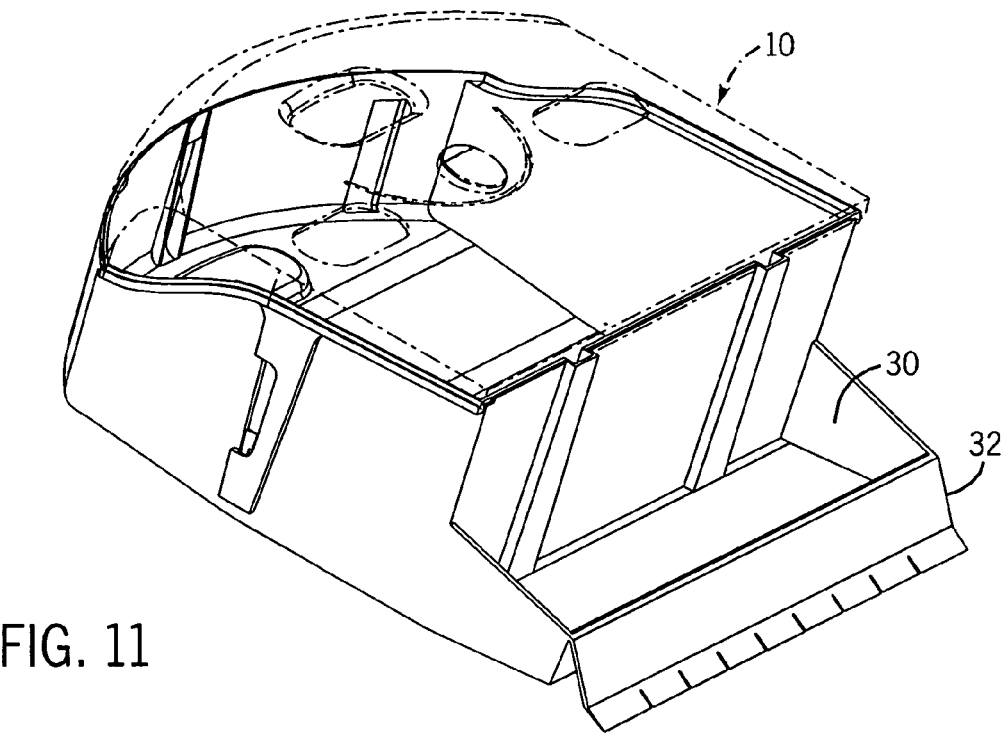
FIG. 11 is a view similar to FIG. 10, but with an upper cover removed.

Although a cleaning cloth 44 has been shown and described particularly designed for use on a hard, smooth floor, a cartridge 10 for use with a carpet is shown in FIGS. 10 and 11. Here, the cartridge comprises a larger dust bin 30, and is weighted appropriately to maintain the cleaning device 12 against the surface to be cleaned, and in an upright position during the cleaning operation.

The cartridge 10 preferably is a replaceable element that can be thrown away as a unit when the sheet material is used up, the fluid in the fluid reservoir 42 is spent, or the dust bin is full. Furthermore, even before the cleaning material is spent, the cartridge 10 can be removed and the dust bin 30 emptied by the user with minimal dust dispersion.

In an alternative embodiment (not shown), the fluid reservoir 42 can deliver fluid directly to the floor during operation. The fluid supply provided in the reservoir 42 is connected to the pump 50 provided in the cleaning device 12 through fluid inlets 40 provided on the cartridge 10 and fluid outlets 48 provided on the cleaning device 12. The controller drives the pump 50 to supply fluid to the floor as necessary during cleaning.

Turning now to key features of the present invention, the cleaning device 12 includes motors 70 and 71 for driving the left wheel 74 and the right wheel 75 of the cleaning device 12, respectively. The motors 70, 71 are each controlled by the programmable controller which includes a microprocessor under the control of a software program stored in a memory. Among other things, the controller provides voltage signals to the motors 70 and 71 that cause the left wheel 74 and the right wheel 75 to start, stop, rotate in a direction causing forward motion of the cleaning device 12, rotate in a direction causing reverse motion of the cleaning device 12, and rotate at increased or decreased speeds.

An encoder is associated with each wheel 74,75 and is connected to the controller. Encoders are commercially available and in one version, the encoder outputs a signal having a pulse every time each wheel 74,75 rotates a predetermined angle. For example, an optical encoder outputs pulses each time an optical beam is broken by an element that rotates with the wheel. The controller respectively calculates the wheel speed of each wheel 74,75 based upon an interval between pulses outputted from each encoder. Changes in the interval between pulses can also be used by the controller to calculate wheel acceleration.

Among other things, the controller can use calculated wheel speeds to control motion of the left wheel 74 and the right wheel 75. In one example algorithm, the controller provides a positive voltage in the range of 0 to +10 volts to each motor 70 and 71 to drive the left wheel 74 and the right wheel 75 in forward motion. The controller uses calculated wheel speeds to determine the amount of voltage to be applied the motors 70 and 71 to control motion of the left wheel 74 and the right wheel 75. Voltage controls the motor speed as voltage will typically be proportional to motor speed. The controller provides a negative voltage in the range of 0 to −10 volts to each motor 70 and 71 to drive the left wheel 74 and the right wheel 75 in reverse motion.

Figure 12:
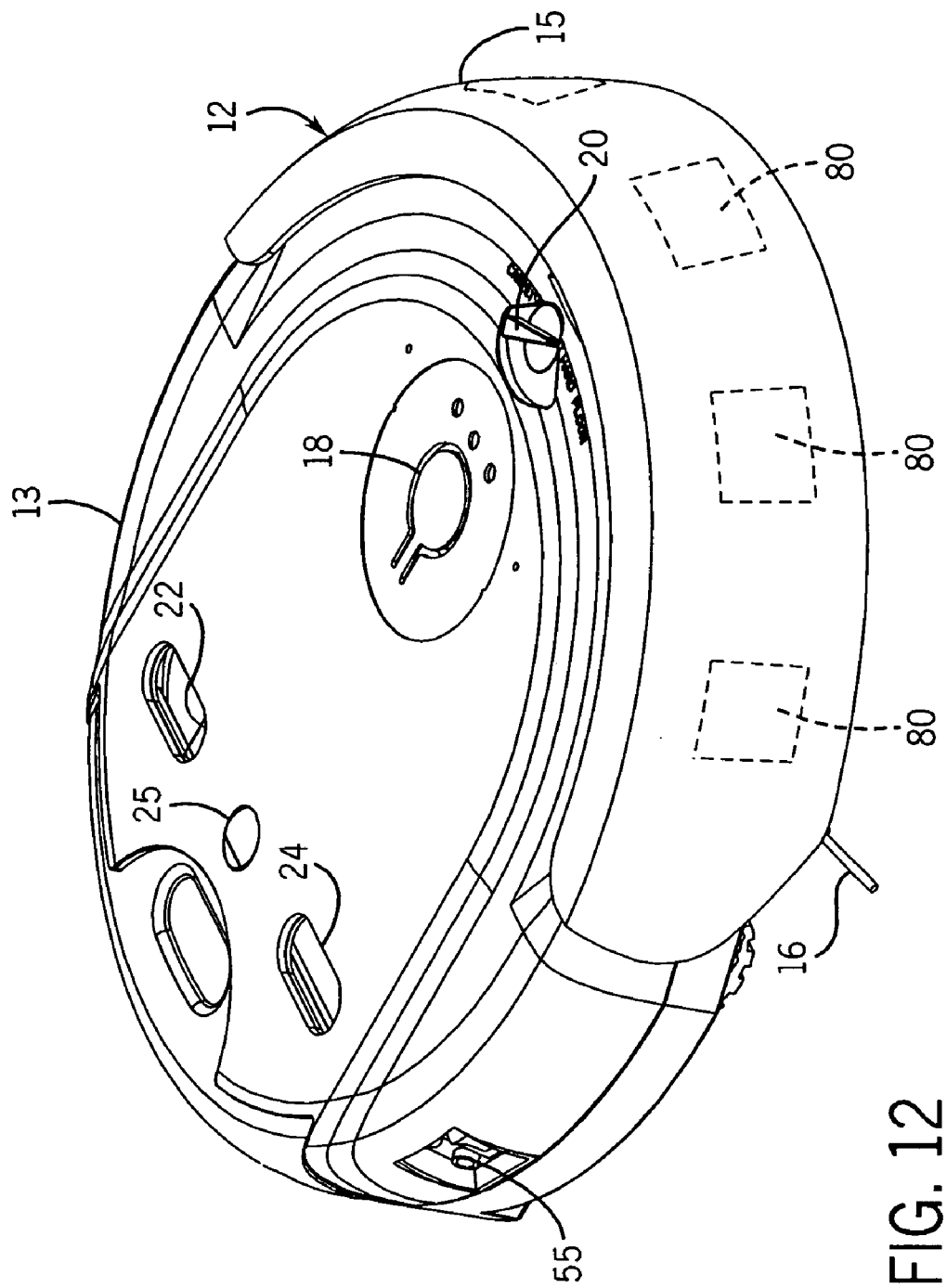
FIG. 12 is a top, left, frontal perspective view of the autonomous robotic surface treating device of FIG. 1, but altered to include the RFID based navigational system of the present invention.
Figure 13:
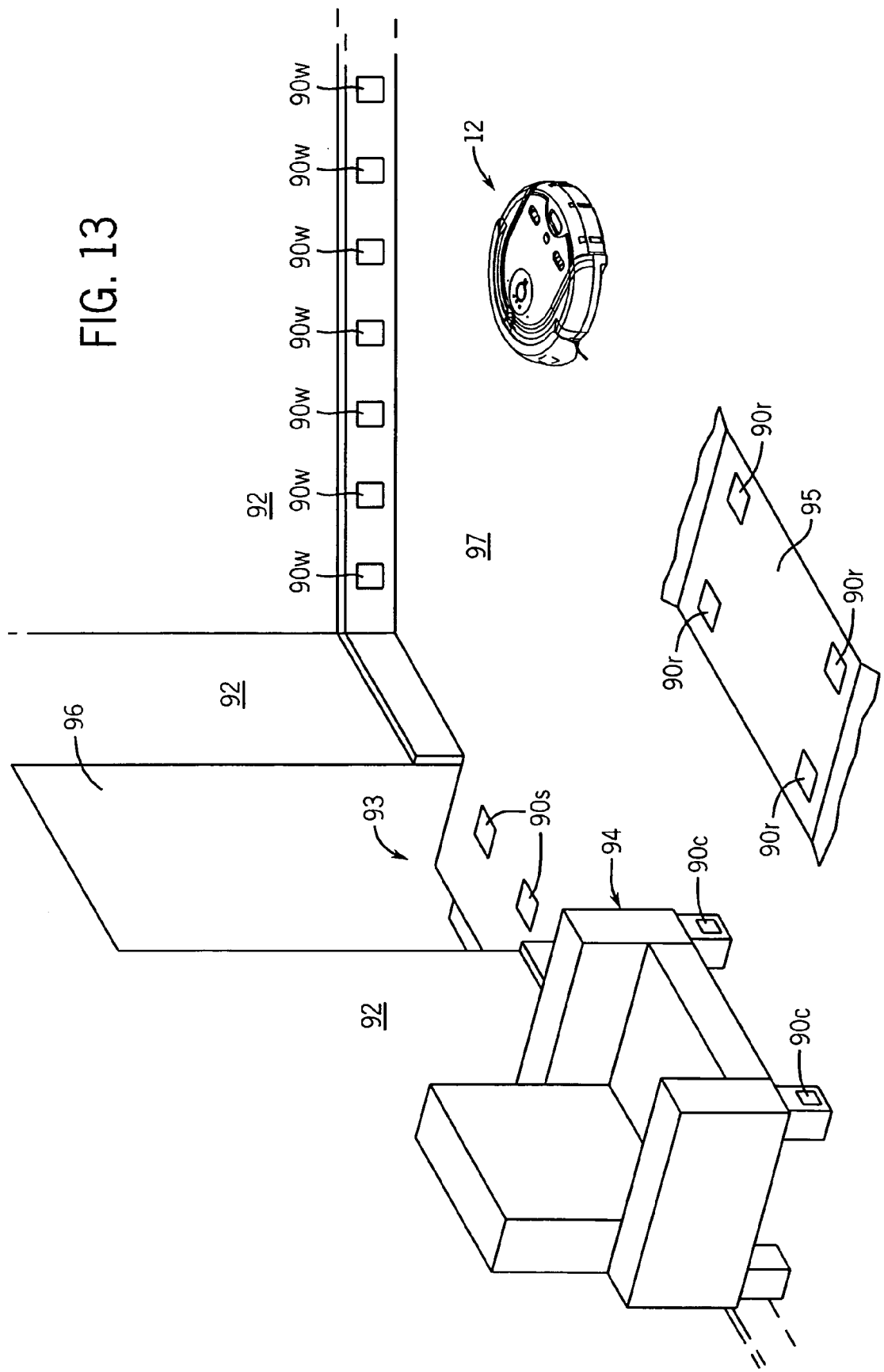
FIG. 13 is a perspective view of a robotic device of the present invention in operation in a room marked with the RFID tags of the present invention.
Figure 14:
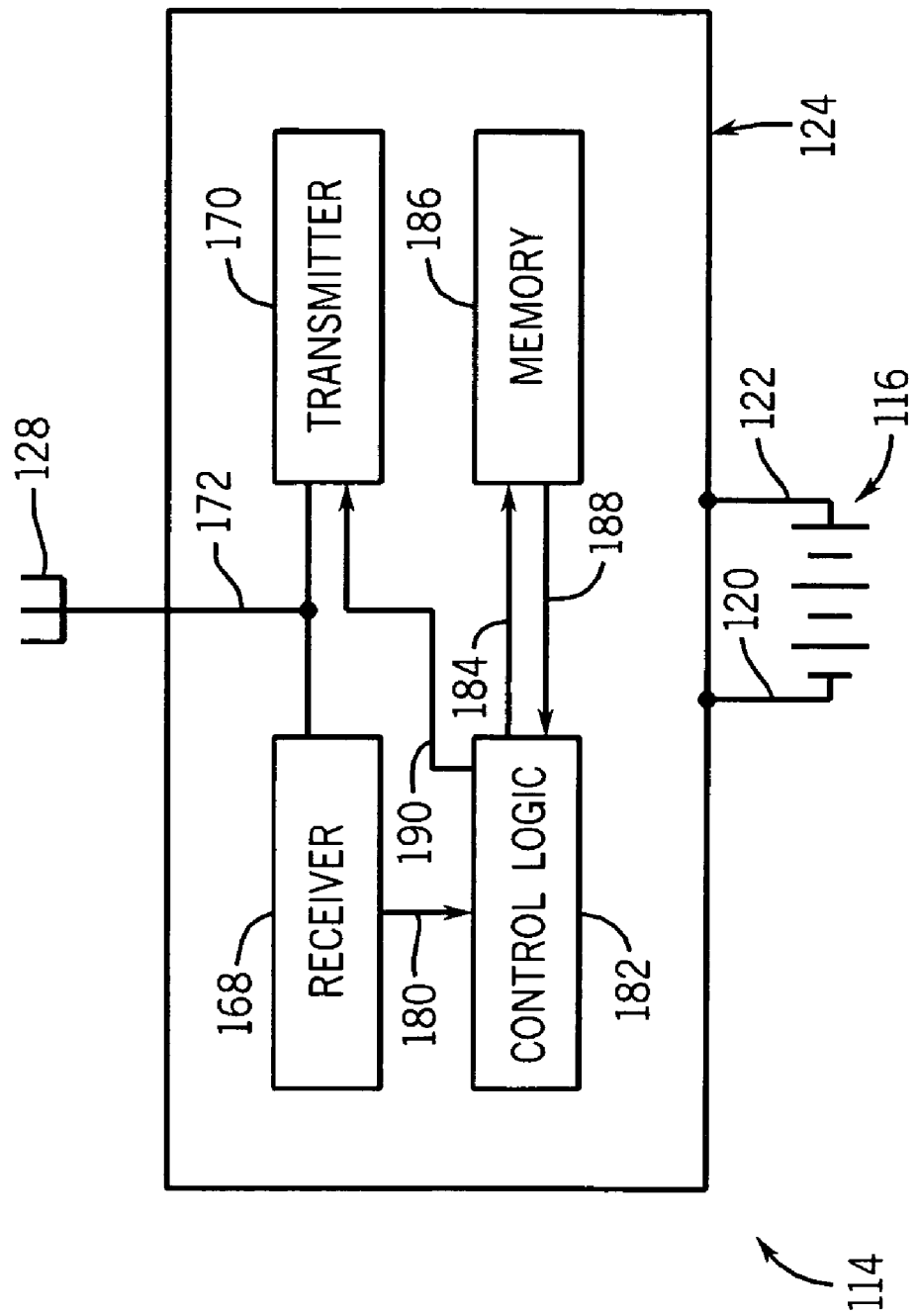
FIG. 14 is a schematic view of an RFID tag's electronics.

Turning next to focus on FIGS. 12-14, the controller is also in electrical communication with radio frequency identification device units 80 that are mounted on the bumper 15 of the cleaning device 12. The RFID units 80 include a radio frequency tag reader which receives unique radio frequency signals from RFID tags (as discussed below) in response to electromagnetic excitation fields emitted from an antenna interrogator in each RFID unit 80. Alternative locations on the cleaning device 12 for the RFID units 80 are also suitable (e.g. top of the housing).

The navigational system includes a number of RFID tags that are placed at selected locations in a room to be cleaned. For example, as indicated in FIG. 13, a set of RFID tags 90$w$ can be placed on the baseboard of a wall 92 of the room to be cleaned; another set of RFID tags 90$s$ can be placed at the entry to the room 96 adjacent steps 93. Yet another set of RFID tags 90$c$ can be placed on the legs of a chair 94 in the room to be cleaned. Still another set of RFID tags 90$r$ can be placed on the perimeter of a delicate rug 95.

The tags 90$w$ could signal the device to spend longer along the wall to try to pick up crumbs that get caught along the edge of the room. This would be achieved by signaling a slow linear motion.

The tags 90$s$ could signal the device to spend longer in a small region near the tags, but not to pass the tags. The tags 90$c$ could signal the device to spend longer adjacent the tags, but with a avoidance area within several inches of the tag.

The tags 90$r$ could signal the device to move quickly over an area adjacent the tags. This would help clean the designated throw rug, without endangering its delicate nature.

FIG. 14 depicts an electrical schematic of an RFID tag such as 90$w$, 90$s$, 90$r$ or 90$c$. There is optionally (but not necessarily) some form of battery power 116 which is connected by line 120 and line 122 to drive an integrated circuit transceiver chip 124. The IC transceiver chip 124 is connected to an antenna 128 which transmits RF signals from the IC transceiver chip 124 and receives incoming RF excitation signals.

The RFID tag's 114 electronics components may be mounted on a suitable substrate such as a plastic or ceramic substrate. The term "radio frequency identification device" as used herein means any device capable of communicating by radio frequency. For example, the term "radio frequency identification device" encompasses devices that transmit or receive any data by radio frequency, not just identification data. One type of RFID is described in U.S. Pat. No. 5,497,140.

Still referring to FIG. 14, the IC transceiver chip 124 of the RFID tag 114 includes an RF receiver 168 and an RF transmitter 170, both connected through line 172 to antenna 128. The receiver 168 is connected through line 180 to a control logic 182, and a line 184 from the control logic 182 is connected to the memory 186. A line 188 from the memory 186 connects back to the control logic 182, and a line 190 from the control logic 182 connects to the transmitter 170 for providing stored data to the transmitter 170 via the control logic 182.

In operation information is transmitted to the receiver 168 via an RF communication link including data such as the room object type (e.g., wall, staircase, chair, rug, etc.). This information received at the receiver 168 is then transmitted over line 180 and through the control logic 182 which sorts this information out in a known manner and in turn transmits the data to be stored in memory 186. The data encoding operation typically will be done by the manufacturer so that a user of the cleaning device 12 is provided with RFID tags 90$w$, 90$s$, 90$r$, 90$c$ appropriately labeled. For example, the RFID tags 90$w$, 90$s$, 90$r$, 90$c$ may have external labels such as wall, staircase, chair, rug, etc.

The incoming RF signals from the antenna of the RFID unit 80 on the cleaning device 12 will send interrogation signals to the RFID tag 114 where they will be received at the antenna 128. The interrogation signals will pass through the receiver 168 and control logic 182 to the memory 186. The memory 186 will produce information relating to the room object type (e.g., wall, staircase, chair, rug, etc.) and generate this data back through the control logic 182 into the transmitter 170 so that the transmitter 170 can now transmit this data to the radio frequency tag reader on the RFID unit 80 of the cleaning device 12.

When the cleaning device 12 is placed on the floor 97 of the room, the activation switch 18 is pressed to activate the navigational system for directing the cleaning device 12 about the floor 97 of the room to be cleaned for a predetermined time period (e.g., sixty minutes). The program in the controller may begin directing the cleaning device 12 about the floor 97 using any number of known behaviors.

U.S. Pat. No. 6,809,490, which is incorporated herein by reference along with all other documents cited herein, describes various initial modes in which the cleaning device 12 may operate. For example, the cleaning device 12 may begin with spiral behavior in which the program provides for outward spiral movement generated by increasing the turning radius of the cleaning device 12 as a function of time. Alternatively, the cleaning device 12 may begin with straight line behavior. Also, the cleaning device 12 may begin with wall-following behavior wherein the cleaning device 12 uses a wall-following sensor to position itself a set distance from the wall 92 and proceeds to travel along the perimeter of the wall 92. Also, the cleaning device 12 may begin with bounce behavior in which the cleaning device 12 travels until a bump sensor in bumper 15 is activated by contact with an obstacle.

Regardless of the initial behavior programmed in the controller directing the cleaning device 12, the cleaning device 12 will eventually approach one of the RFID tags 90w, 90s, 90r, 90c. The RF signals from the antenna of the RFID unit 80 on the cleaning device 12 will send interrogation signals to the RFID tags 90w, 90s, 90r, 90c. The interrogation signals will pass through the RFID tag receiver and control logic to the memory. The RFID tag memory will produce information relating to the room object type (e.g., wall, staircase, chair, rug, etc.) and generate this data back through the control logic into the transmitter so that the transmitter transmits this data to the radio frequency tag reader on the RFID unit 80 of the cleaning device 12. The RFID unit 80 of the cleaning device 12 then communicates the encountered room object type to the controller.

The software in the controller then determines what action the cleaning device 12 needs to take based on the room object type data received from the RFID unit 80. For instance, if the controller receives data from the RFID unit 80 indicating that the cleaning device 12 has come upon a delicate rug 95 (i.e., RFID tag 90r has been encountered), the controller executes a selected software routine speeding up the device so as to dwell less on the rug. The speed is then reduced after the rug is passed over.

Of course, these example software routines can be programmed and stored into the controller of the cleaning device 12. In this manner, "attraction" routines that provide for extended cleaning or other treatment, and "avoidance" routines that reduce dwell times can all be executed by the controller.

Although specific embodiments of the present invention have been described in detail, it should be understood that this description is merely for purposes of illustration. Many modifications and variations to the specific embodiments will be apparent to those skilled in the art, which will be within the spirit and scope of the invention. Therefore, the invention should not be limited to the described embodiments. Rather, the claims should be looked to in order to judge the full scope of the invention.

INDUSTRIAL APPLICABILITY

Disclosed are RFID-based systems for automatically altering the dwell time of robotic cleaners with respect to defined surface areas.

The invention claimed is:

1. A system for navigating an automatic cleaning device within a location, the system comprising:
   a radio frequency identification tag positioned within or adjacent a selected surface area comprising a percentage of total surface area within the location; and
   an automatic cleaning device including a controller for driving the automatic cleaning device within the location for a predetermined time period, the controller being in communication with a radio frequency identification unit which receives signals from the radio frequency identification tag indicating presence of the selected surface area,
   wherein the controller executes a stored program to drive the automatic cleaning device within the selected surface area for a modified time period greater than or less than a reference time period calculated by multiplying the predetermined time period by the percentage, and
   wherein the radio frequency identification tag is temporarily positioned within or adjacent the selected surface area for marking temporary conditions of the selected surface area, and
   wherein the temporary conditions of the selected surface area include (i) that the selected surface area has extra soil which causes the automatic cleaning device to clean for a longer time period near the radio frequency identification tag and (ii) that the selected surface area is too clean to need further treatment which causes the controller to be informed that dwell time near the radio frequency identification tag should be reduced or eliminated and (iii) that the selected surface area is an area in which the automatic cleaning device should spend no time, and
   wherein when the selected surface area is an area in which the automatic cleaning device should spend no time, the radio frequency identification tag is positioned in the center of the area in which the automatic cleaning device should spend no time, and the controller executes a stored program to avoid driving the automatic cleaning device within a predetermined distance of the radio frequency identification tag.

2. The system of claim 1, wherein:
   the modified time period is greater than the reference time period.

3. The system of claim 2, wherein:
   the selected surface area is dirtier than a remainder of the total surface area other than the selected surface area before driving the automatic cleaning device within the location.

4. The system of claim 1, wherein:
   the selected surface area is less dirty than a remainder of the total surface area other than the selected surface area before driving the automatic cleaning device within the location, and
   the modified time period is less than the reference time period.

5. The system of claim 1, wherein:
   the selected surface area comprises a floor covering.

6. The system of claim 1, wherein:
   the selected surface area is adjacent a wall.

7. The system of claim 1, wherein:
   the selected surface area is dirtier than a remainder of the total surface area other than the selected surface area before driving the automatic cleaning device within the location, and
   the modified time period is greater than the reference time period.

8. A method for navigating an automatic cleaning device within a location, the automatic cleaning device including a controller for driving the automatic cleaning device within the location for a predetermined time period, the method comprising:

positioning a radio frequency identification tag within or adjacent a selected surface area comprising a percentage of total surface area within the location;

providing a radio frequency identification unit which receives signals from the radio frequency identification tag indicating presence of the selected surface area, the radio frequency identification unit being in communication with the controller; and providing in the controller a stored program that drives the automatic cleaning device within the selected surface area for a modified time period greater than or less than a reference time period calculated by multiplying the predetermined time period by the percentage, wherein the radio frequency identification tag is temporarily positioned within or adjacent the selected surface area for marking temporary conditions of the selected surface area, and wherein the temporary conditions of the selected surface area include (i) that the selected surface area has extra soil which causes the automatic cleaning device to clean for a longer time period near the radio frequency identification tag and (ii) that the selected surface area is too clean to need further treatment which causes the controller to be informed that dwell time near the radio frequency identification tag should be reduced or eliminated and (iii) that the selected surface area is an area in which the automatic cleaning device should spend no time, and wherein when the selected surface area is an area in which the automatic cleaning device should spend no time, the radio frequency identification tag is positioned in the center of the area in which the automatic cleaning device should spend no time, and the stored program avoids driving the automatic cleaning device within a predetermined distance of the radio frequency identification tag.

9. The method of claim 8, wherein:
the modified time period is greater than the reference time period.

10. The method of claim 9, wherein:
the selected surface area is dirtier than a remainder of the total surface area other than the selected surface area before driving the automatic cleaning device within the location.

11. The method of claim 8, wherein:
the selected surface area is less dirty than a remainder of the total surface area other than the selected surface area before driving the automatic cleaning device within the location, and the modified time period is less than the reference time period.

12. The method of claim 8, wherein:
the selected surface area comprises a floor covering.

13. The method of claim 8, wherein:
the selected surface area is adjacent a wall.

14. A system for navigating an automatic cleaning device within a location, the system comprising:

a radio frequency identification tag:
positioned within or adjacent a selected surface area comprising a percentage of total surface area within the location; and
configured to transmit an instruction indicating a temporary condition of the selected surface area to a radio frequency identification unit;

and an automatic cleaning device including a controller for driving the automatic cleaning device within the location for a predetermined time period, the controller being in communication with the radio frequency identification unit which receives the instruction from the radio frequency identification tag, wherein the controller executes a stored program to drive the automatic cleaning device within the selected surface area for a modified time period greater than or less than a reference time period calculated by multiplying the predetermined time period by the percentage, and wherein the radio frequency identification tag is temporarily positioned within or adjacent the selected surface area, and wherein the temporary conditions of the selected surface area include (i) that the selected surface area has extra soil which causes the automatic cleaning device to clean for a longer time period near the radio frequency identification tag and (ii) that the selected surface area is too clean to need further treatment which causes the controller to be informed that dwell time near the radio frequency identification tag should be reduced or eliminated and (iii) that the selected surface area is an area in which the automatic cleaning device should spend no time, and wherein when the instruction indicates that the temporary condition of the selected surface area is an area in which the automatic cleaning device should spend no time, a plurality of the radio frequency identification tags are positioned near a perimeter of the area in which the automatic cleaning device should spend no time, and the controller executes a stored program that utilizes the instruction from each of the radio frequency identification tags to avoid driving the automatic cleaning device within the perimeter of the area in which the automatic cleaning device should spend no time.

15. The system of claim 14, wherein:
the selected surface area is less dirty than a remainder of the total surface area other than the selected surface area before driving the automatic cleaning device within the location, and
the modified time period is less than the reference time period.

16. The system of claim 14, wherein:
the selected surface area comprises a floor covering.

17. The system of claim 14, wherein:
the selected surface area is adjacent a wall.

18. A method for navigating an automatic cleaning device within a location, the automatic cleaning device including a controller for driving the automatic cleaning device within the location for a predetermined time period, the method comprising:

positioning a radio frequency identification tag:
within or adjacent a selected surface area comprising a percentage of total surface area within the location; and
configured to transmit an instruction indicating a condition of the selected surface area;

providing a radio frequency identification unit which receives the instruction from the radio frequency identification tag, the radio frequency identification unit being in communication with the controller; and providing in the controller a stored program that drives the automatic cleaning device within the selected surface area for a modified time period greater than or less than a reference time period calculated by multiplying the predetermined time period by the percentage, wherein the radio frequency identification tag is temporarily positioned within or adjacent the selected surface area for marking temporary conditions of the selected surface area, and wherein the temporary conditions of the selected surface area include (i) that the selected surface area has extra soil which causes the automatic cleaning device to clean for a longer time period near the radio frequency identification tag and (ii) that the selected surface area is too clean to need further treatment which causes the controller to be informed that dwell time near the radio frequency identification tag should be reduced or eliminated and (iii) that the selected surface area is an area in which the automatic cleaning device should spend no time, and wherein when the selected surface area is an area in which the automatic cleaning device should spend no time:

each of a plurality of the radio frequency identification tags is positioned proximate to the selected surface area and is configured to transmit the instruction to spend no time;

and the stored program avoids driving the automatic cleaning device within the perimeter of the area in which the automatic cleaning device should spend no time.

19. The method of claim 18, wherein:

the selected surface area is dirtier than a remainder of the total surface area other than the selected surface area before driving the automatic cleaning device within the location, and the modified time period is greater than the reference time period.

20. The method of claim 18, wherein:

the selected surface area is less dirty than a remainder of the total surface area other than the selected surface area before driving the automatic cleaning device within the location, and the modified time period is less than the reference time period.

21. The method of claim 18, wherein:

the selected surface area comprises a floor covering.

22. The method of claim 18, wherein:

the selected surface area is adjacent a wall.

23. The system of claim 18, wherein the plurality of the radio frequency identification tags are positioned within a perimeter of the selected surface area.

* * * * *